US008782625B2

(12) United States Patent
Godefroid et al.

(10) Patent No.: US 8,782,625 B2
(45) Date of Patent: Jul. 15, 2014

(54) MEMORY SAFETY OF FLOATING-POINT COMPUTATIONS

(75) Inventors: Patrice Godefroid, Mercer Island, WA (US); Johannes Kinder, Darmstadt (DE)

(73) Assignee: Microsoft Corporation, Redmond, WA (US)

( * ) Notice: Subject to any disclaimer, the term of this patent is extended or adjusted under 35 U.S.C. 154(b) by 1010 days.

(21) Appl. No.: 12/817,227

(22) Filed: Jun. 17, 2010

(65) Prior Publication Data
US 2011/0314251 A1 Dec. 22, 2011

(51) Int. Cl.
*G06F 9/45* (2006.01)
*G06F 9/44* (2006.01)

(52) U.S. Cl.
USPC ............ 717/151; 717/126; 717/127; 717/149; 717/159

(58) Field of Classification Search
CPC ......... G06F 8/443; G06F 8/445; G06F 8/456; G06F 11/3466
See application file for complete search history.

(56) References Cited

U.S. PATENT DOCUMENTS

| | | | | |
|---|---|---|---|---|
| 5,073,891 A * | 12/1991 | Patel | ............................ | 714/720 |
| 5,302,956 A | 4/1994 | Asbury et al. | | |
| 7,308,460 B2 | 12/2007 | Venkatesh et al. | | |
| 7,694,283 B2 * | 4/2010 | Sano et al. | .................... | 717/136 |
| 7,840,954 B2 * | 11/2010 | Gschwind | ..................... | 717/159 |
| 7,966,609 B2 * | 6/2011 | Serebryany | ................... | 717/151 |
| 8,108,657 B2 * | 1/2012 | Barraclough et al. | ........ | 712/222 |
| 8,312,433 B2 * | 11/2012 | Ben-Yehuda et al. | ........ | 717/127 |
| 8,341,611 B2 * | 12/2012 | Munshi et al. | ................ | 717/149 |
| 8,423,983 B2 * | 4/2013 | Gschwind | ..................... | 717/151 |
| 8,539,451 B2 * | 9/2013 | Ivancic et al. | ................. | 717/126 |
| 2003/0167458 A1 * | 9/2003 | Santhanam et al. | .......... | 717/114 |
| 2005/0273605 A1 | 12/2005 | Saha et al. | | |
| 2006/0107253 A1 * | 5/2006 | Sano et al. | .................... | 717/123 |
| 2008/0244241 A1 * | 10/2008 | Barraclough et al. | ........ | 712/222 |
| 2009/0132861 A1 * | 5/2009 | Costa et al. | ..................... | 714/45 |
| 2011/0004644 A1 * | 1/2011 | Henry et al. | .................. | 708/231 |

OTHER PUBLICATIONS

Collingbourne et al., Symbolic crosschecking of floating-point and SIMD code, Apr. 2011, 14 pages.*
Aamodt et al., Compile-time and instruction-set methods for improving floating- to fixed-point conversion accuracy, Apr. 2008, 27 pages.*
Marché, et al., "Jessie Plugin Tutorial", Retrieved at << http://frama-c.com/jessie/jessie-tutorial.pdf >>, Version: 2.23, Feb. 2, 2010, pp. 28.
"Firefox: Multiple Vulnerabilities", Retrieved at << http://www.auscert.com.au/11885 >>, Nov. 5, 2009, pp. 6.

(Continued)

*Primary Examiner* — Thuy Dao
(74) *Attorney, Agent, or Firm* — Steve Wight; Carole Boelitz; Micky Minhas

(57) ABSTRACT

Concepts and technologies are described herein for determining memory safety of floating-point computations. The concepts and technologies described herein analyze code to determine if any floating-point computations exist in the code, and if so, if the floating-point computations are memory safe. The analysis can include identifying floating-point instructions and conditional statements in the code. The code can be symbolically executed, and behavior of the floating-point instructions and the conditional statements can be monitored to determine if a floating point calculation is ever involved in computation of any memory address during the execution of the code.

20 Claims, 6 Drawing Sheets

(56) References Cited

OTHER PUBLICATIONS

Nelson, et al., "What Makes a Code Review Trustworthy?", Retrieved at << http://ti.arc.nasa.gov/people/schumann/publications/papers/2003/hicss-37.pdf >>, HICSS, Proceedings of the Proceedings of the 37th Annual Hawaii International Conference on System Sciences (HICSS'04), Track 9, vol. 9, Jan. 5-8, 2004, pp. 1-23.

Czajkowski, et al., "Automated and Portable Native Code Isolation", Retrieved at << http://research.sun.com/techrep/2001/smli_tr-2001-96.ps >>, 12 International Symposium on Software Reliability Engineering (ISSRe'01), Nov. 27-30, 2001, pp. 18.

"Technical Report Abstracts Database", at << http://www.cl.cam.ac.uk/techreports/tr-abstracts.txt >>, Retrieved Date: Mar. 26, 2010, pp. 181.

Abadi, et al., "Dynamic Typing in a Statically-typed Language", Retrieved at << http://www.hpl.hp.com/techreports/Compaq-DEC/SRC-RR-47.pdf >>, ACM Transactions on Programming Languages and Systems (TOPLAS), vol. 13, No. 2, Apr. 1991, pp. 1-35.

Balakrishnan, et al., "Analyzing Memory Accesses in X86 Executables", Retrieved at << http://www.cs.wisc.edu/wpis/papers/cc04.pdf >>, Compiler Construction, 13th International Conference, CC, Held as Part of the Joint European Conference on Theory and Practice of Software, ETAPS, Mar. 29-Apr. 2, 2004, pp. 18.

Cadar, et al., "EXE: Automatically Generating Inputs of Death", Retrieved at << http://www.stanford.ed/~cristic/papers/exe-ccs-06.pdf >>, Conference on Computer and Communications Security, Proceedings of the 13th ACM conference on Computer and communications security, Oct. 30-Nov. 3, 2006, pp. 14.

Srivastava, et al., "Vulcan: Binary Transformation in a Distributed Environment", Retrieved at << http://research.microsoft.com/pubs/69850/tr-2001-50.pdf >>, Technical Report, MSR-TR-2001-50, Apr. 20, 2001, pp. 1-12.

Elkarablieh, et al., "Precise Pointer Reasoning for Dynamic Test Generation", Retrieved at << http://research.microsoft.com/en-us/um/people/pg/public_psfiles/issta2009.pdf >>, International Symposium on Software Testing and Analysis, Proceedings of the eighteenth international symposium on Software testing and analysis, Jul. 19-23, 2009, pp. 11.

Flanagan, Cormac., "Hybrid Type Checking", Retrieved at << http://66.102.9.132/search?q=cache:N9C7t2rO1UAJ:www.cse.ucsc.edu/~cormac/papers/popl06-hybrid.ps+Hybrid+type+checking&cd=3&hl=en&ct=clnk&gl=in >>, Annual Symposium on Principles of Programming Languages, Conference record of the 33rd ACM SIGPLAN-SIGACT symposium on Principles of programming languages, Jan. 11-13, 2006, pp. 21.

Godefroid, et al., "DART: Directed Automated RandomTesting", Retrieved at << http://research.microsoft.com/en-us/um/people/pg/public_psfiles/pldi2005.pdf >>, ACM SIGPLAN Notices, Proceedings of the 2005 ACM SIGPLAN conference on Programming language design and implementation, vol. 40, No. 6, Jun. 2005, pp. 11.

Godefroid, et al., "Active Property Checking", Retrieved at << http://research.microsoft.com/pubs/70464/tr-2007-91.pdf>>, TechReport, MSR-TR-2007-91, Jul. 2007, pp. 12.

Godefroid, et al., "Automated Whitebox Fuzz Testing", Retrieved at << http://research.microsoft.com/en-us/um/people/pg/public_psfiles/ndss2008.pdf >>, Technical Report, MS-TR-2007-58, May 2007, pp. 16.

"Intel 64 and IA-32 Architectures Software Developer's Manual", Retrieved at << http://www.intel.com/Assets/PDF/manual/253668.pdf >>, vol. 3A, System Programming Guide, Part 1, Dec. 2009, pp. 808.

Kinder, et al., "Jakstab: A Static Analysis Platform for Binaries", Retrieved at << http://66.102.9.132/search?q=cache:rfNe9NQqkV0J:www.forsyte.cs.tu-darmstadt.de/~kinder/download.php%3Ft%3D2%26k%3Dcav08+Jakstab:+A+static+analysis+platform+for+binaries&cd=2&hl=en&ct=clnk&gl=in >>, Lecture Notes in Computer Science, Proceedings of the 20th international conference on Computer Aided Verification, vol. 5123, Jul. 7-14, 2008, pp. 7.

Lengauer, et al., "A Fast Algorithm for Finding Dominators in a Flowgraph", Retrieved at << http://citeseerx.ist.psu.edu/viewdoc/download;jsessionid=ED59A1F7E6842E858185F716C583BEDB?doi=10.1.1.117.8843&rep=rep1&type=pdf >>, ACM Transactions on Programming Languages and Systems (TOPLAS), vol. 1, No. 1, Jul. 1979, pp. 121-141.

Molnar, et al., "Dynamic Test Generation to Find Integer Bugs in X86 Binary Linux Programs", Retrieved at << http://www.usenix.org/events/sec09/tech/full_papers/molnar.pdf >>, In Proceedings of 18th USENIX Security Symposium on USENIX Security Symposium, 2009, pp. 1-15.

Monniaux, David., "The Pitfalls of Verifying Floating-point Computations", Retrieved at << http://arxiv.org/PS_cache/cs/pdf/0701/0701192v5.pdf >>, May 23, 2008, pp. 1-40.

Necula, et al., "CCured: Type-safe Retrofitting of Legacy Code", Retrieved at << http://www.cs.virginia.edu/~weimer/p/p128-necula.pdf >>, Annual Symposium on Principles of Programming Languages, Proceedings of the 29th ACM SIGPLAN-SIGACT symposium on Principles of programming languages, Jan. 16-18, 2002, pp. 128-139.

Raman, et al., "Implementing Streaming SIMD Extensions on the Pentium III Processor", Retrieved at << http://ieeexplore.ieee.org/stamp/stamp.jsp?tp=&arnumber=865866 >>, IEEE Micro, vol. 20, No. 4, Jul. 2000, pp. 47-57.

Sabelfeld, et al., "Language-Based Information-Flow Security", Retrieved at << http://citeseerx.ist.psu.edu/viewdoc/download?doi=10.1.1.19.4873&rep=rep1&type=pdf >>, IEEE Journal on Selected Areas in Communications, to Appear, 2002, pp. 1-15.

Wolper, P., "Expressing Interesting Properties of Programs in Propositional Temporal Logic", Retrieved at << http://portal.acm.org/ft_gateway.cfm?id=512661&type=pdf&coll=GUIDE&dl=GUIDE&CFID=81719424&CFTOKEN=60714226 >>, Annual Symposium on Principles of Programming Languages, Proceedings of the 13th ACM SIGACT-SIGPLAN symposium on Principles of programming languages, 1986, pp. 184-193.

Godefroid, et al., "Proving Memory Safety of Floating-Point Computations by Combining Static and Dynamic Program Analysis", Retrieved at << http://research.microsoft.com/en-us/um/people/pg/public_psfiles/issta2010.pdf >>, In International Symposium on Software Testing and Analysis (ISST'10), 2010, pp. 10.

\* cited by examiner

MEMORY SAFETY OF FLOATING-POINT COMPUTATIONS

BACKGROUND

Whitebox fuzzing is a form of security testing of application code based upon runtime symbolic execution and constraint solving. Over the years, whitebox fuzzing techniques have been used to identify security vulnerabilities in applications such as compressor-decompressors ("codecs"), image viewers, parsers, media players, and other applications. These types of applications, however, increasingly make use of floating-point instructions available on modern processors. Unfortunately, whitebox fuzzing techniques and constraint solvers are not well-suited to provide efficient analysis and constraint solving of floating-point instructions.

Furthermore, attempts to extend symbolic execution and constraint solving to address floating-point instructions are likely insufficient to solve the looming difficulty of floating-point instruction analysis. For example, as floating-point constraints become more complex and more prevalent, merely extending existing analysis and solving capabilities to analyze floating-point instructions may not address more complex constraints than those currently existing. Thus, such a naïve approach may eventually create more problems and even more pronounced path explosion issues than those already faced.

It is with respect to these and other considerations that the disclosure made herein is presented.

SUMMARY

Concepts and technologies are described herein for determining memory safety of floating-point computations. The concepts and technologies described herein allow floating-point instructions to be efficiently and accurately analyzed to determine if the floating-point computations are memory safe. A first analysis includes a lightweight local path-insensitive static analysis of code for floating-point instructions, and a second analysis includes evaluating the floating-point instructions and conditional statements to determine if the floating-point instructions and the conditional statements are memory safe.

During the first analysis, floating-point instructions are identified, and a set of memory addresses and/or registers written during execution of the floating-point instruction is computed. Additionally, conditional statements are recognized, and two sets are computed. The first set contains any register whose value may be used to compute a memory address being read or written during execution of the conditional statement, and the second set includes memory addresses and/or registers that may be written to during execution of the conditional statement.

The second analysis includes symbolic execution of the code. When floating-point instructions are encountered, a symbolic value is written to each value of the set calculated for the floating point instruction, thereby effectively injecting a symbolic value for values calculated by the floating-point instructions. If the symbolic value injected during the symbolic execution of the floating-point instruction is used to compute any memory address dereferenced during execution of the code, a runtime error or other alarm may be generated. If the symbolic value is not used to compute any memory address during the symbolic execution, that floating point instruction can be deemed safe.

During the symbolic execution of the code, the safety of all conditional statements in the code are determined. A conditional statement is encountered during the symbolic execution, and all values of the first set are evaluated to determine if any register in the first set has a symbolic value. If so, a runtime error or other alarm may be generated. If not, execution continues until the immediate postdominator of the conditional statement is reached. The value of every memory address and register in the second set is assigned a symbolic value. If the symbolic value is used to compute any memory address or register during execution of the code, a runtime error or other alarm may be generated. If the symbolic value is not used to compute any memory address or register during the symbolic execution, the conditional statement can be deemed safe.

According to one aspect, a data storage device stores code to be analyzed by an evaluation engine. The evaluation engine receives the code and analyzes the entire code, or receives a portion of the code extracted by a code parser. The evaluation engine can include one or more test applications such as, for example, a static test application and a dynamic test application. The static test application is configured to identify floating-point instructions in the code, if any exist, and to compute of memory addresses and/or registers written during execution of the floating-point instruction is computed. The static test application also is configured to identify conditional statements in the code, if any exist, and to compute two sets for each conditional statement identified. The first set contains any register whose value may be used to compute a memory address being read or written during execution of the conditional statement, and the second set includes memory addresses and/or registers that may be written to during execution of the conditional statement. If no floating-point instructions or conditional statements exist, the evaluation engine can obtain another portion of the code or can pass the code as memory safe.

According to another aspect, the evaluation engine includes a dynamic test application that is configured to symbolically execute the code. During the symbolic execution, a symbolic value is written to each value in the set computed for floating point instructions. If the symbolic value is used to calculate any memory address during the symbolic execution, the floating point instruction, and therefore the portion of code being analyzed, can be deemed not memory safe, and an alert or error can be generated. If the symbolic value is not used to calculate any memory address during the symbolic execution, the floating-point instruction or the code can be deemed memory safe, and a pass or similar notification can be generated.

According to another aspect, the dynamic test application also evaluates floating-point dependent conditional statements. When a floating-point dependent conditional statement is reached during the symbolic execution, the dynamic test application attempts to skip execution of the conditional statement, and effectively treats the conditional statement as a single floating-point instruction. If any register in the first set has any symbolic value, an error is generated.

Symbolic execution resumes, and before the immediate postdominator instruction of the floating-point conditional statement is reached, the symbolic value of every memory address and register in the second set is set to a symbolic value in the symbolic store. If the symbolic value is used to calculate any memory address during the symbolic execution, the floating-point dependent conditional statement, and therefore the portion of code being analyzed, can be deemed not memory safe, and an alert or error can be generated. If the symbolic value is not used to calculate any memory address during the symbolic execution, the floating-point dependent conditional statement and/or the code can be deemed memory safe, and a pass or similar notification can be generated.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
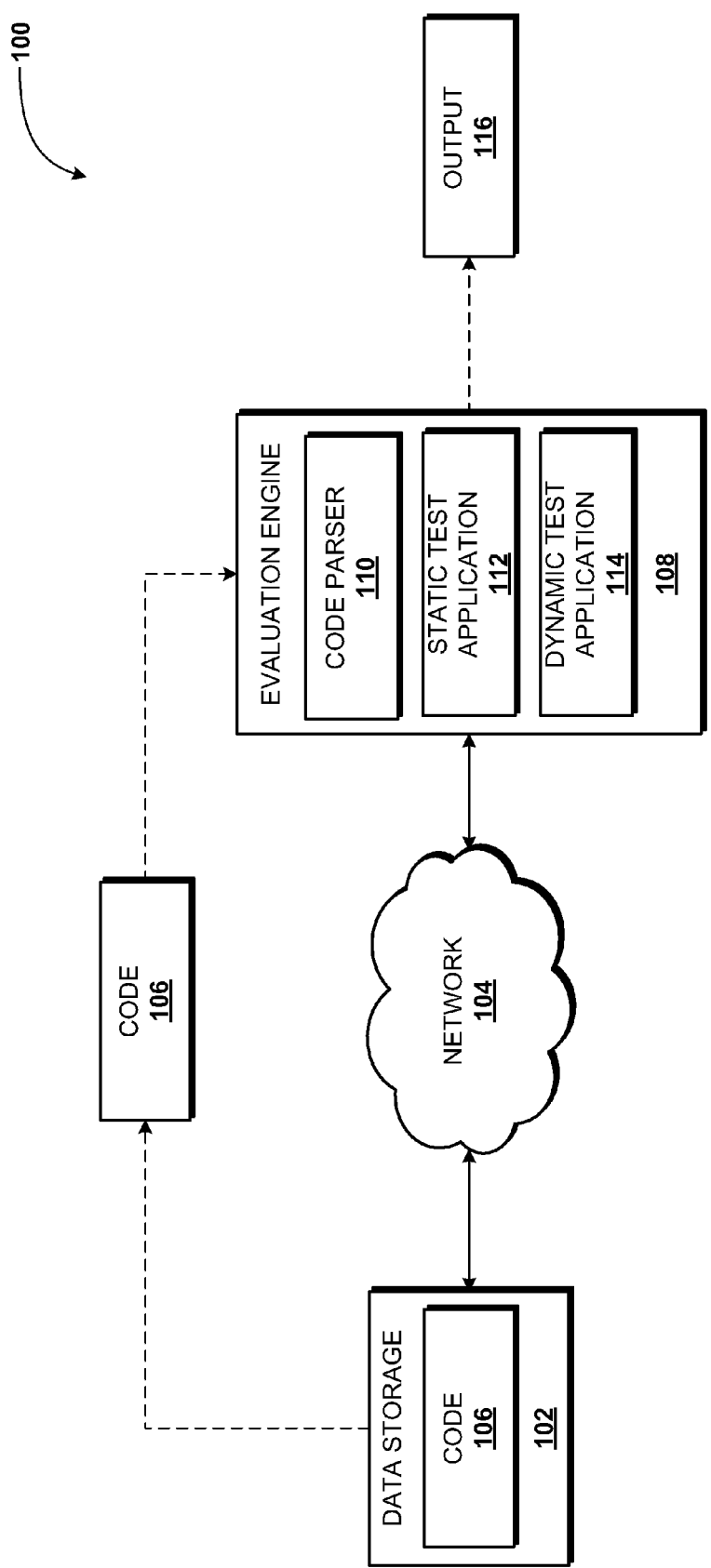
FIG. 1 is a system diagram illustrating an exemplary operating environment for the various embodiments disclosed herein.

This application is related to a white paper by the inventors entitled "Proving Memory Safety of Floating-Point Computations by Combining Static and Dynamic Program Analysis," available for download at the URL address "http://research.microsoft.com/en-us/um/people/pg/public_psfiles/issta2010.pdf," which is hereby incorporated by reference in its entirety. The following detailed description is directed to concepts and technologies for determining memory safety of floating-point computations. According to the concepts and technologies described herein, code is analyzed and floating-point instructions and conditional statements in the code are identified, analyzed, and determined to be memory safe or memory unsafe.

During a first portion of the analysis, the floating point instructions are identified and a set of memory addresses and/or registers written during execution of the floating-point instruction are computed. Conditional statements also are identified during the first portion of the analysis, and two sets are computed for each conditional statement. The first set contains any register whose value may be used to compute a memory address being read or written during execution of the conditional statement, and the second set includes memory addresses and/or registers that may be written to during execution of the conditional statement.

During a second analysis, the code is symbolically executed. When a floating-point instruction is encountered, a symbolic value is written to each value in the set computed for the floating-point instruction, and thereby injected into the symbolic execution of the code to perform a dynamic taint-flow analysis of the code. In the case of the floating-point instruction, the special symbolic value is injected at the point in the symbolic execution at which the floating-point instruction is called.

The evaluation engine also can evaluate floating-point dependent conditional statements. The evaluation engine uses a lightweight static analysis to approximate all possible executions in the statement, and to compute a set of non-floating-point registers that may be used to compute a memory address being read or written to during execution of the floating-point dependent conditional statement, and a set of memory addresses or non-floating-point registers that may be written to during execution of the floating-point dependent conditional statements.

When the floating-point dependent conditional statements are encountered during the symbolic execution of the code, the dynamic test application attempts to skip execution of the conditional statement, and effectively treats the conditional statement as a single floating-point instruction. If any register in the first set has any symbolic value, an error is generated.

Symbolic execution resumes, and before the immediate postdominator instruction of the floating-point conditional statement is reached, the symbolic value of every memory address and register in the second set is set to a symbolic value in the symbolic store. If the symbolic value is used to calculate any memory address during the symbolic execution, the floating-point dependent conditional statement, and therefore the portion of code being analyzed, can be deemed not memory safe, and an alert or error can be generated. If the symbolic value is not used to calculate any memory address during the symbolic execution, the floating-point dependent conditional statement and/or the code can be deemed memory safe, and a pass or similar notification can be generated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for proving memory safety of floating-point computations will be presented.

Referring now to FIG. 1, aspects of one operating environment 100 for the various embodiments presented herein will be described. The operating environment 100 shown in FIG. 1 includes a data storage device 102. According to various embodiments, the data storage device 102 described herein may be provided by one or more data storage locations, server computers, computer readable media (as defined herein), desktop computers, mobile telephones, laptop computers, other computing systems, and the like. In the illustrated embodiment, the data storage device 102 is described as a server computer configured to operate on or in communication with a network 104. It should be understood that this embodiment is exemplary.

As illustrated in FIG. 1, the data storage device 102 stores or hosts code 106. The code 106 can include executable code such as, for example, computer-executable instructions corresponding to one or more programs, applications, modules, and the like. In some embodiments, for example, the code 106 includes executable instructions of software applications such as image parsers, codecs, media applications, and the like. It should be understood that the code 106 may be, or may be included as part of, a software suite or application such as WINDOWS MEDIA PLAYER from MICROSOFT CORPORATION of Redmond, Wash. It should be understood that in the description herein, the code 106 may be a portion of code taken from an application or software package, may be the code of an entire application or software package, and/or may be a single instruction taken from a block of code.

The operating environment 100 also includes an evaluation engine 108 operating on or in communication with the network 104. The evaluation engine 108 is configured to provide the functionality described herein for determining memory safety of floating-point instructions. The evaluation engine 108 is configured to execute an operating system (not illustrated) and one or more application programs such as, for example, a code parser 110, a static test application 112, a dynamic test application 114, and/or other application programs.

The operating system is a computer program for controlling the operation of the evaluation engine 108. The application programs are executable programs configured to execute on top of the operating system to provide the functionality described herein. Although the code parser 110, the static test application 112, and the dynamic test application 114 are illustrated as components of the evaluation engine 108, it should be understood that each of these components, or combinations thereof, may be embodied as or in stand-alone devices or components thereof operating on or in communication with the network 104 and/or the evaluation engine 108.

The code parser 110 is configured to receive code 106, to identify a portion of the code 106 for analysis, and to extract the portion of the code for the analysis. As will be explained in more detail below with reference to FIGS. 2-4, the code 106 can include one or more portions, one or more of which may be analyzed by the evaluation engine 108. In some embodiments, for example, the evaluation engine 108 identifies portions of the code 106 that include floating-point instructions, or portions of the code 106 that are likely to include floating-point instructions, and parses those portions of the code 106 for analysis. In other embodiments, the code parser 110 is configured to extract portions of the code 106 based upon any desired considerations including, but not limited to, the amount of data the evaluation engine 108 is configured to evaluate at any particular time, a portion corresponding to an instruction, a portion corresponding to a block of instructions, or the like.

The static test application 112 is configured to analyze the code 106, or a portion thereof, to identify floating-point instructions and conditional statements. As will be described in more detail below with reference to FIGS. 3A-3C, the static test application 112 can analyze the code 106 during a non-execution phase, if desired. According to various embodiments, the floating-point instructions are recognizable by the static test application 112 based upon recognition of a format and structure that differs from non-floating-point instructions, as is generally known. If no floating-point instructions or conditional statements are identified in the code 106, or a portion thereof, the static test application 112 can determine if the analyzed code 106 includes another portion to be analyzed. It will be understood that the static test application 112 can query the code parser 110, if desired, to obtain another portion of code 106 to analyze.

If the static test application 112 identifies floating-point instructions or conditional statements, the static test application 112 can generate output 116 for the evaluation engine 108 or for another entity. The output 116 can include an alarm and/or an indication that a floating-point instruction or conditional statement has been identified. In some embodiments, the alarm and/or indication is recognized by the evaluation engine 108 and/or triggers a second analysis of the floating-point instruction or conditional statement to determine if the floating-point instruction or conditional statement is memory safe instead of, or in addition to, outputting the alarm as an error. The second analysis can be provided by the static test application 112 or the dynamic test application 114. For purposes of clarifying the description herein, the second analysis is described as being provided by the dynamic test application 114. It should be understood that this embodiment is exemplary.

The static test application 112 also is configured to generate a set of memory addresses and/or registers written during execution of the floating-point instruction. In the case of conditional statements, the static test application 112 is configured to compute a set of non-floating-point registers that may be used to compute a memory address being read or written to during execution of the conditional statement, and a set of memory addresses or non-floating-point registers that may be written to during execution of the conditional statements. These sets are used during a second analysis, as is explained below in detail with reference to FIGS. 3A-3C.

The dynamic test application 114 is configured to analyze the code 106 to determine if the identified floating-point instructions or conditional statements are memory safe. The dynamic test application 114 is configured to symbolically execute the code 106. During the symbolic execution of the code 106, the dynamic test application 114 leverages symbolic evaluation rules to perform a dynamic taint-flow analysis of the floating-point instructions by injecting the symbolic value FP-tag for each value in the set of memory addresses and/or registers written during execution of the floating-point instruction, and monitoring the results of the symbolic execution of the code 106. With respect to floating-point instructions, in particular, the dynamic test application 114 is configured to determine if the value FP-tag is used in any way to compute a memory address dereferenced during the symbolic execution of the code 106. If the value FP-tag is used to compute any address during execution of the code 106, the evaluation engine 108 can generate an alarm or other output 116, as such a condition can be recognized by the dynamic test application 114 as indicating a memory unsafe floating-point instruction. If the value FP-tag is not used to compute any address during execution of the code 106, the dynamic test application 114 can generate output 116 indicating that that the code 106 passes the test.

With respect to conditional statements, when the dynamic test application 114 encounters the conditional statements during the symbolic execution of the code 106, the dynamic test application 114 attempts to skip execution of the conditional statement. The dynamic test application 114 first determines if any register in the set of non-floating-point registers that may be used to compute a memory address being read or written to during execution of the conditional statement includes a symbolic value. In particular, the dynamic test application 114 determines if any register is input-dependent, or FP-tag. If any register has a symbolic value, the dynamic test application 114 generates an error. If no register has a symbolic value, the dynamic test application 114 continues the symbolic execution.

Symbolic execution continues, and before the immediate postdominator instruction of the floating-point conditional statement is reached, the dynamic test application 114 assigns every memory address and register in the second set to FP-tag. If the value FP-tag is used to compute any address during execution of the code 106, the evaluation engine 108 can generate an alarm or other output 116, as such a condition can be recognized by the dynamic test application 114 as indicating a memory unsafe floating-point dependent conditional statement. If the value FP-tag is not used to compute any address during execution of the code 106, the dynamic test application 114 can generate output 116 indicating that that the code 106 passes the test. These and other features of the dynamic test application 114 are described herein.

FIG. 1 illustrates one data storage device 102, one network 104, and one evaluation engine 108. It should be understood, however, that some implementations of the operating environment 100 include multiple data storage devices 102, multiple networks 104, and multiple evaluation engines 110. Therefore, the illustrated embodiment should be understood as being exemplary, and should not be construed as being limiting in any way.

Figure 2:
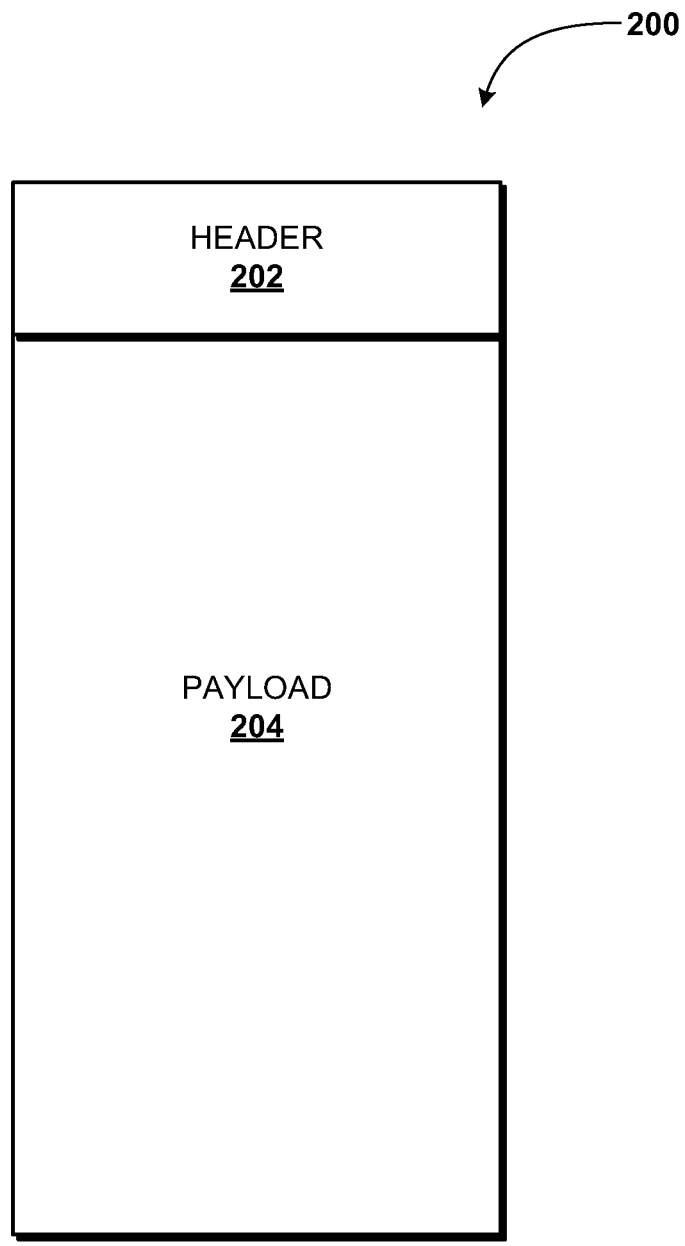
FIG. 2 is a block diagram schematically illustrating aspects of a file that may be executed by the code, according to some embodiments disclosed herein.

Turning now to FIG. 2, additional aspects of the code 106 and the analysis thereof are described. In particular, FIG. 2 is block diagram schematically illustrating a data file 200 that may be executed by the code 106, according to an exemplary embodiment of the present disclosure. As shown in FIG. 2, the data file 200 includes a header portion 202 ("header") and a payload portion 204 ("payload"). It should be understood that the illustrated embodiment is exemplary, and that the data file 200 can include additional or alternative components in addition to, or instead of, the illustrated header 202 and the payload 204.

The header 202 includes data that describes the data file 200. For example, if the data file 200 corresponds to an image or video file, the header 202 may describe the payload 204. In the example of an image file, the header 202 may describe the resolution of the image, the number of colors present in the image, a compression ratio, and the like. If the data file 200 corresponds to a movie file, the header 202 may set forth a codec used to compress/decompress the movie, a duration of the movie file, a resolution of the movie file, a frame rate of the movie file, the number of colors present in the movie file, the number of data blocks present in the movie file, and the like. It should be understood that these examples are illustrative.

The payload 204 of the data file 200 includes the data of the image file corresponding to the content of the data file 200 such as the movie, song, image, or other data item represented by the data file 200. In general, the payload 204 can be interpreted by the code 106, via execution of the code 106 by a device, as a movie, song, image, or other file, as mentioned above. Generally speaking, a computer may receive the data file 200. The code 106, for example an image parser, executes the data file 200. During execution of the data file 200, the code 106 may analyze the header 202 to determine how to interpret the data file 200, to determine how much memory should be allocated for the data item represented by the data file 200, as well as for other purposes. Because the header 202 is used to allocate memory, in various embodiments described herein, the evaluation engine 108 is configured to recognize that errors are most likely to occur during execution of the header 202.

In various embodiments described herein, the evaluation engine 108 is configured to recognize that errors are unlikely to occur during execution of floating-point instructions in the payload 204. More particularly, the evaluation engine 108 is configured to recognize that the floating-point instructions sometimes identified in the payload 204 are rarely, if ever, used to calculate memory addresses. Thus, the evaluation engine 108 is configured to recognize that errors resulting from the payload 204 are rare. It should be understood that the illustrated data file 200 is exemplary, and should not be construed as being limiting in any way.

Figure 3A:
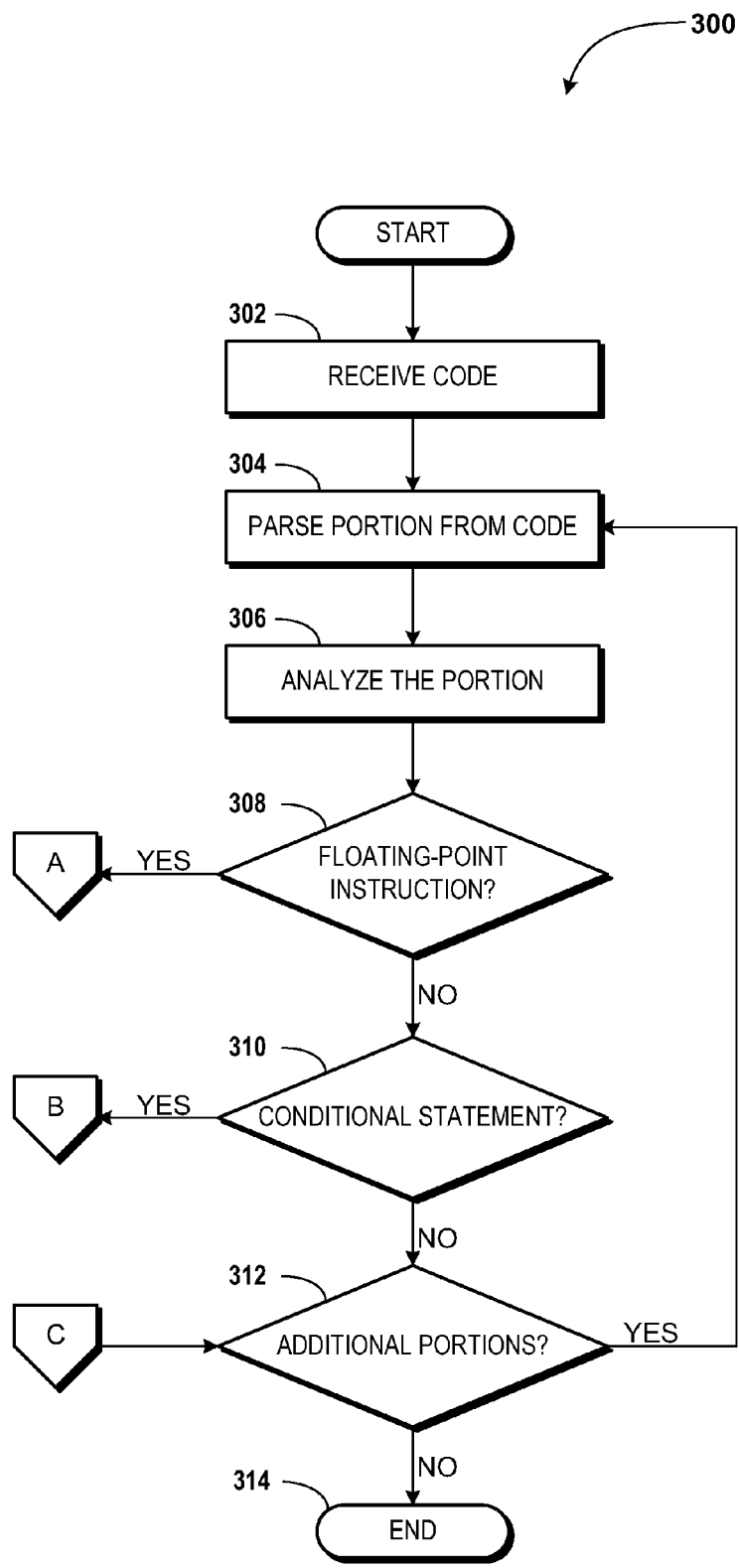
FIGS. 3A-3C are flow diagrams showing aspects of a method for proving memory safety of code, according to exemplary embodiments.
Figure 3B:
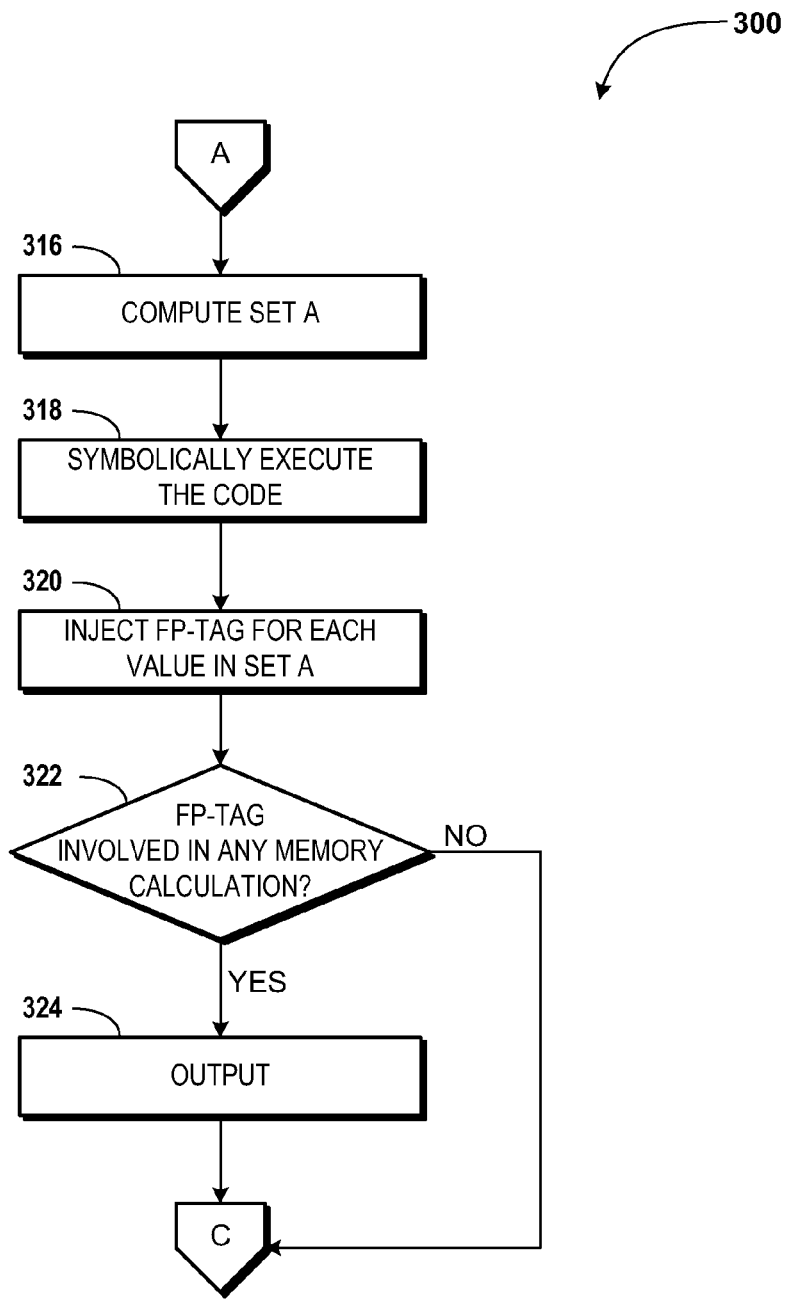
Figure 3C:
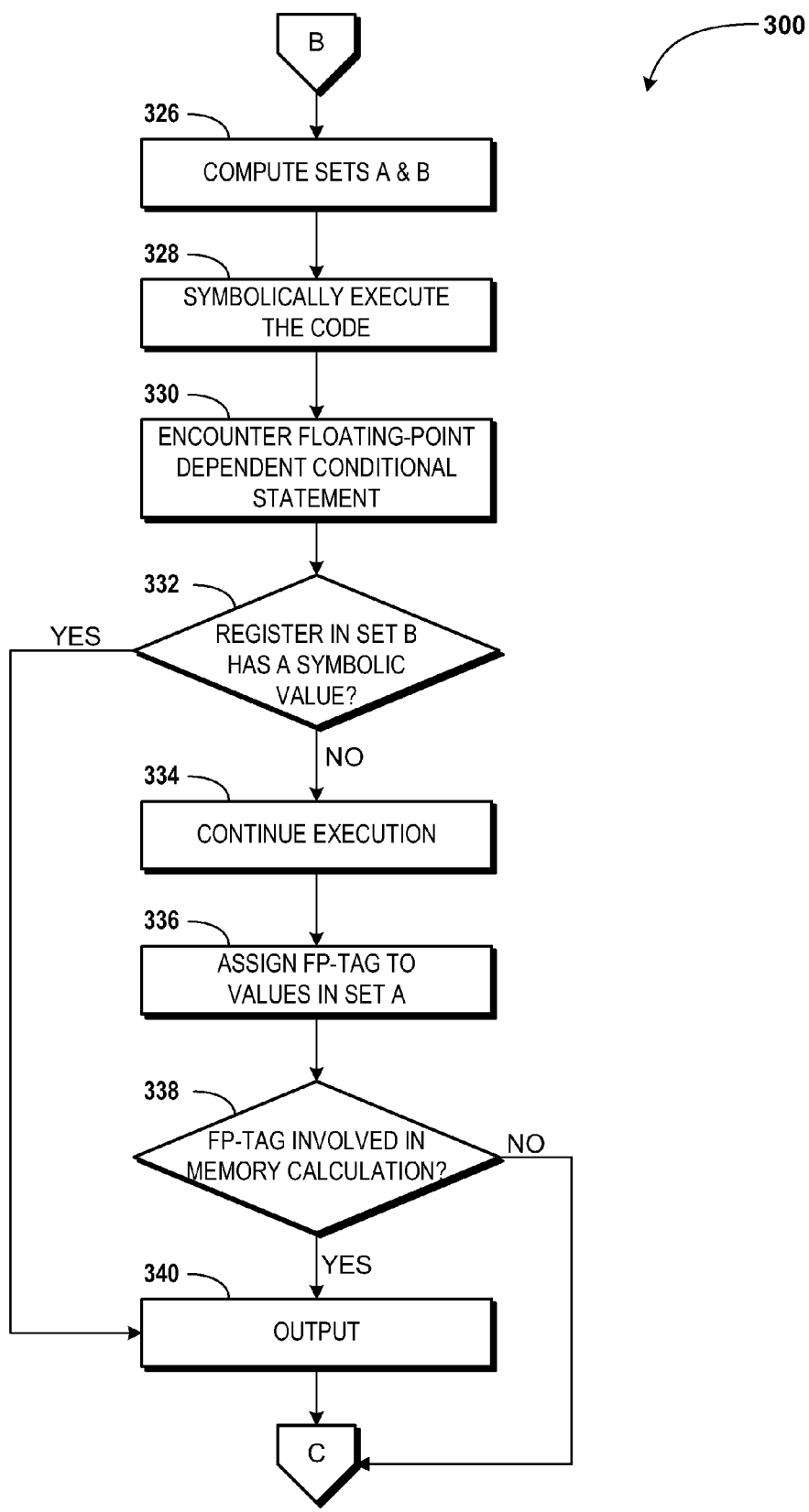

Turning now to FIGS. 3A-3C, aspects of a method 300 for determining memory safety of the code 106 will be described in detail. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method can be ended at any time and need not be performed in its entirety. Some or all operations of the method, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the evaluation engine 108. It should be understood that these embodiments are exemplary, and should not be viewed as being limiting in any way. The method 300 begins at operation 302, wherein the evaluation engine 108 receives the code 106. The code 106 can include almost any instructions including, but not limited to, an image file, a video file, a music file, a software package, an application, a program module, portions and combinations thereof, and the like. It should be understood that the evaluation engine 108 may be employed to test a large collection of code 106, and that the evaluation engine 108 may test the code 106 one or more portions at a time. For purposes of more clearly describing the concepts and technologies disclosed herein, the code 106 is described as corresponding to an application for parsing an image file such as, for example, a Joint Photographic Experts Group ("JPEG") image file or a Graphics Interchange Format ("GIF") image file. Thus, the code 106 may correspond to a JPEG parser application or a GIF parser application. It should be understood that this embodiment is exemplary, and should not be construed as being limiting in any way.

From operation 302, the method 300 proceeds to operation 304, wherein the evaluation engine 108 parses the code 106. The evaluation engine 108 can parse any portion of the code 106 to evaluate, as explained above. In one embodiment, the code parser 110 of the evaluation engine 108 parses the code 106 to extract a block of instructions corresponding to a desired size, a particular type of function, a single instruction, or another portion. In some embodiments, the evaluation engine 108 is configured to analyze the code 106 in portions extracted by the code parser 110.

In some embodiments, operation 304 can include successively parsing portions from the code 106 for evaluation by the evaluation engine 108. In some embodiments, the evaluation engine 108 analyzes blocks of instructions parsed from the code 106 based upon a function of the block. For example, the code parser 110 may search the code 106 for an if-else-then statement or other conditional statement for analysis. It should be understood that the code 106 may be analyzed in its entirety, and that the code parser 110 may therefore be superfluous in some embodiments.

From operation 304, the method 300 proceeds to operation 306, wherein the evaluation engine 108 analyzes the code 106. As explained above, the evaluation engine 108 can analyze any desired amount of instructions parsed from the code 106 including, but not limited to, all instructions corresponding to the code 106. In some embodiments, the evaluation engine 108 analyzes the code 106 using the static test application 112. The static test application 112 is configured to search the code 106 for floating-point instructions and conditional statements.

As mentioned above, floating-point instructions are recognizable by the static test application 112, and conditional statements also easily are recognized by the static test application 112. The static test application 112 may recognize floating-point instructions based upon their structure and/or format, which may differ from non-floating-point instructions. Additionally, or alternatively, the static test application 112 can recognize floating-point instructions based upon recognition of particular statements that are known to be floating-point-dependent, or based upon how other instructions rely upon values calculated by the floating-point instructions. For example, the evaluation engine 108 may search the code 106 for assignment statements, and check all identified assignment statements to determine if the assignment statements are floating-point assignments. Regardless of the particular method used to recognize floating-point instructions, the static test application 112 is configured to analyze the code 106, or a portion thereof, to determine if the code 106 includes any floating-point instructions.

As illustrated at operation 308, the evaluation engine 108 determines if the analyzed code 106 includes any floating-point instructions. It will be understood that the determination of operation 308 may be based upon the analysis of operation 306, wherein if any floating-point instructions are identified, the evaluation engine 108 determines that floating-point instructions are included in the analyzed code 106. If the evaluation engine 108 determines that the analyzed code 106 does not include any floating-point instructions, the method 300 proceeds to operation 310. If the evaluation engine 108 determines that the analyzed code 106 includes one or more floating-point instructions, the method 300 proceeds with the operations described below with reference to FIG. 3B.

In operation 310, the evaluation engine 108 determines if the analyzed code 106 includes one or more conditional statements. If the evaluation engine 108 determines that the analyzed code 106 does not include any conditional statements, the method 300 proceeds to operation 312. If the evaluation engine 108 determines that the analyzed code 106 includes one or more conditional statements, the method 300 proceeds with the operations described below with reference to FIG. 3C.

In operation 312, the evaluation engine 108 determines if the code 106 includes any additional portions that may be evaluated by the evaluation engine 108. If the code 106 includes one or more additional portions that may be evaluated, the method 300 returns to operation 304, wherein the evaluation engine 108 parses another portion, as explained above with respect to operation 304. If the evaluation engine 108 determines that no additional portions of the code 106 that may be evaluated remain, the method 300 may end, as illustrated at operation 314.

Although not illustrated in FIG. 3A, it should be understood that if the method 300 reaches operation 314 without recognizing any floating-point instructions or conditional statements in the code 106, the evaluation engine 108 can generate output 116 such as, for example, an indication that the analysis is complete, an indication that no errors have been identified, combinations thereof, and the like.

Turning now to FIG. 3B, additional aspects of the method 300 for determining memory safety of floating-point computations will be described in detail. The method 300 continues at operation 316, wherein the evaluation engine 108 computes a set A of memory addresses or regular non-floating-point registers that are written to during the execution of the floating-point instruction. It should be understood that the set A can be computed for each floating-point instruction at compile time or on-demand at run time. Thus, the demonstrated order of the operations in method 300 is exemplary, and should not be construed as being limiting in any way. The computation of the set A requires less computational resources than those required to provide a precise symbolic execution of the floating-point instruction.

From operation 316, the method 300 proceeds to operation 318, wherein the evaluation engine 108 begins symbolic execution of the code 106. During the symbolic execution of the code 106, all memory address dereferences are checked passively and actively for memory access violations. The symbolic execution of the code 106 continues until a floating-point instruction is reached.

From operation 318, the method 300 proceeds to operation 320, wherein the evaluation engine 108 substitutes regular symbolic execution of the floating point instruction with insertion of a symbolic value used to represent a result of execution of the floating-point instruction. In particular, the evaluation engine 108 replaces the symbolic value of every memory address and register in the set A with the symbolic value FP-tag. The symbolic value FP-tag is a single symbolic value that represents all possible floating-point values during symbolic execution, as well as all symbolic expressions that depend on a floating-point value.

In some embodiments, the value FP-tag is what is referred to as an absorbing element with respect to the symbolic expression evaluation. Thus, any expression containing FP-tag is FP-tag. Furthermore, any floating-point specific expression also returns FP-tag. Thus, the assignment of FP-tag for all possible output values of the floating-point instruction makes recognition of memory access violations during symbolic execution readily detectable.

From operation 320, the method 300 proceeds to operation 322, wherein the evaluation engine 108 determines if the symbolic value FP-tag is involved in any memory calculation during the symbolic execution of the code 106. Because the value of all memory addresses and registers in the set A associated with the floating-point instructions have been set to FP-tag, the evaluation engine 108 may make this determination based upon determining if any memory address ever depends upon the value FP-tag.

If any memory address depends upon the value FP-tag, the method 300 proceeds to operation 324, wherein the evaluation engine 108 generates the output 116. The output 116 can include generation of an error, generation of a flag for the floating-point instruction that generated the error, generation of an alarm, or other action. The output 116 can be presented to a user of the evaluation engine 108 or another device or system, if desired.

If the evaluation engine 108 determines in operation 322 that FP-tag is not used to calculate a memory address, or after the output 116 is generated in operation 324, the method 300 can return to operation 312 of FIG. 3B, wherein the evaluation engine 108 can determine if there are additional portions of the code 106 to analyze. Though not illustrated in FIG. 3B, the evaluation engine 108 can be configured to generate a "pass" notification or other feedback for a user or system upon determining that FP-tag is not used by the code 106 to calculate a memory address. It should be understood that code 106 that does not use floating-point instructions to calculate any memory address can be deemed memory safe. At operation 312, as mentioned above, if no additional portions of the code 106 remain to be analyzed, the method 300 proceeds to operation 314, wherein the method 300 ends.

Turning now to FIG. 3C, additional aspects of the method 300 for determining memory safety of floating-point computations will be described in detail. The method 300 continues at operation 326, wherein the evaluation engine 108 computes a set A of memory addresses or regular non-floating-point registers that are written to during the execution of the conditional statement. The evaluation engine 108 also computes a set B of registers whose value at the time of executing the conditional statement may be used to compute a memory address being read or written during the execution of the conditional statement. It should be understood that the sets A and B can be computed for each conditional statement at compile time or on-demand at run time. Thus, the demonstrated order of the operations in method 300 is exemplary, and should not be construed as being limiting in any way. The computation of the sets A and B requires less computational resources than those required to provide a precise symbolic execution of the conditional statement.

From operation 326, the method 300 proceeds to operation 328, wherein the evaluation engine 108 begins symbolic execution of the code 106. During the symbolic execution of the code 106, all memory address dereferences are checked passively and actively for memory access violations. The symbolic execution of the code 106 continues until a conditional statement is encountered, as illustrated at operation 330.

From operation 330, the method 300 proceeds to operation 332, wherein the evaluation engine 108 attempts to skip execution of the conditional statement, and effectively treats the conditional statement as a single floating-point instruction. In particular, the evaluation engine 108 determines if any register in the set A has any symbolic value. In particular, the evaluation engine 108 determines if any register in the statically computed set A is either input-dependent, or the symbolic value FP-tag. If the evaluation engine 108 determines that any register in the statically computed set A is either input-dependent or the symbolic value FP-tag, the evaluation engine 108 can generate an error, as will be described below with reference to operation 340. If the evaluation engine 108 determines that no register in the statically computed set A is input-dependent or FP-tag, the method 300 proceeds to operation 334, wherein the symbolic execution is resumed until the immediate postdominator of the conditional statement is reached.

From operation 334, the method 300 proceeds to operation 336, wherein the evaluation engine 108 assigns FP-tag to each value in the statically computed set B. From operation 336, the method 300 proceeds to operation 338, wherein the evaluation engine 108 determines if the symbolic value FP-tag is involved in any memory calculation during the symbolic execution of the code 106. Because the value of all memory addresses and registers in the set A associated with the have been set to FP-tag, the evaluation engine 108 may make this determination based upon determining if any memory address ever depends upon the value FP-tag. If any memory address depends upon the value FP-tag, the method 300 proceeds to operation 340, wherein the evaluation engine 108 generates the output 116. As explained above, the output 116 can include generation of an error, a flag relating to the conditional statement that generated the error, an alarm, or another action. The output 116 can be presented to a user of the evaluation engine 108 or another device or system, if desired.

If the evaluation engine 108 determines in operation 338 that FP-tag is not used to calculate a memory address, or after the output 116 is generated by the evaluation engine 108, the method 300 returns to operation 312 of FIG. 3B, wherein the evaluation engine 108 determines if there are additional portions of the code 106 to analyze. Though not illustrated in FIG. 3B, the evaluation engine 108 can be configured to generate a "pass" notification or other feedback for a user or system upon determining that FP-tag is not used by the code 106 to calculate a memory address. It should be understood that code 106 that does not use floating-point-dependent conditional statements to calculate any memory address can be deemed memory safe. At operation 312, as mentioned above, if no additional portions of the code 106 remain to be analyzed, the method 300 proceeds to operation 314, wherein the method 300 ends.

Figure 4:
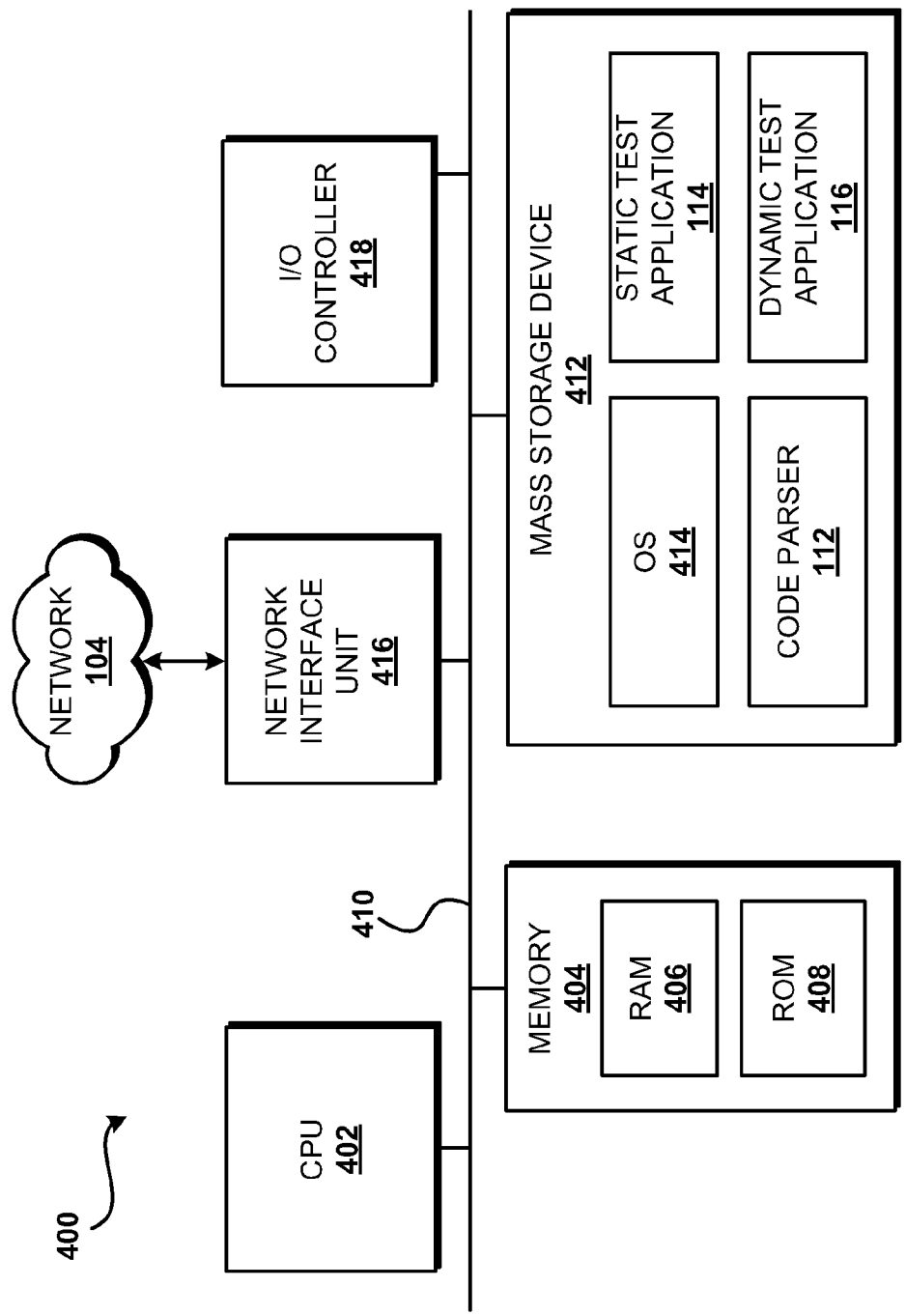
FIG. 4 is a computer architecture diagram illustrating an exemplary computer hardware and software architecture for a computing system capable of implementing aspects of the embodiments presented herein.

FIG. 4 illustrates an exemplary computer architecture 400 for a device capable of executing the software components described herein for determining memory safety of floating-point calculations. Thus, the computer architecture 400 illustrated in FIG. 4 illustrates an architecture for a server computer, mobile phone, a PDA, a smart phone, a server computer, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 414, the code parser 110, the static test application 112, and the dynamic test application 114. The mass storage device 412 also can be configured to store the code 106.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media that can be accessed by the computer architecture 400.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes of this specification and the claims, the phrase "computer-readable storage medium" and variations thereof, does not include waves, signals, and/or other transitory and/or intangible communication media.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems, for example, the data storage device 102. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4).

As mentioned briefly above, a number of program modules and data files may be stored in the mass storage device 412 and RAM 406 of the computer architecture 400, including the operating system 414 suitable for controlling the operation of the server, desktop, and/or laptop computer. The mass storage device 412 and RAM 406 also may store other types of program modules and data.

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for determining memory safety of floating-point calculations have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for determining memory safety of floating point instructions, the computer-implemented method comprising performing computer-implemented operations for:

receiving a portion of code at an evaluation engine, the code comprising computer executable instructions corresponding to an application;

analyzing, by a computing device, the portion of the code to determine if the portion of the code comprises a floating-point instruction; and in response to determining that the portion of the code comprises the floating-point instruction, generating, by the computing device, a set of memory addresses and registers written during execution of the floating-point instruction, symbolically executing, by the computing device, the portion of the code, assigning, by the computing device, a symbolic value into the set for each memory address and register in the set, and determining, by the computing device, if the symbolic value is used to calculate any memory address during the symbolic execution.

2. The method of claim 1, wherein the symbolic value comprises all possible values for a floating-point calculation made during the symbolic execution of the code.

3. The method of claim 1, further comprising in response to determining that the portion of the code does not comprise the floating-point instruction, analyzing, by the computing device, the portion of code to determine if the portion of code comprises a conditional statement.

4. The method of claim 3, further comprising in response to determining that the portion of the code comprises the conditional statement, generating, by the computing device, a first set comprising a set of memory addresses and registers written during execution of the conditional statement, generating, by the computing device, a second set comprising a set of registers that may be used to compute a memory address being read or written to during execution of the conditional statement, and symbolically executing, by the computing device, the portion of the code.

5. The method of claim 4, further comprising:

in response to determining that the portion of the code does not comprise the floating-point instruction or the conditional statement, obtaining another portion of code to determine if the other portion of code comprises any floating-point instructions or any conditional statements.

6. The method of claim 4, further comprising:

determining, by the computing device, if a register in the second set comprises an input-dependent address or the symbolic value, and in response to determining that the register in the second set comprises the input-dependent address or the symbolic value, generating an error.

7. The method of claim 6, further comprising:

in response to determining that the register in the second set does not comprise the input-dependent address or the symbolic value, resuming the symbolic execution, assigning, by the computing device, the symbolic value to each memory address and register in the first set, and determining, by the computing device, if the symbolic value is used to calculate any memory address during the symbolic execution.

8. The method of claim 7, further comprising:

in response to determining that the symbolic value is used to calculate the memory address during the symbolic execution, generating an error.

9. The method of claim 8, further comprising:

in response to determining that the symbolic value is not used to calculate the memory address during the symbolic execution, obtaining another portion of code to determine if the other portion of code comprises any floating-point instructions or any conditional statements.

10. The method of claim 1, wherein the symbolic value comprises FP-tag, the value of FP-tag comprising all possible values for a floating-point calculation made during execution of the floating point instruction, and wherein assigning the symbolic value further comprises assigning, by the computing device, FP-tag for each value in the set of memory addresses and registers.

11. A computer-implemented method for determining memory safety of floating point instructions, the computer-implemented method comprising performing computer-implemented operations for:

receiving code at an evaluation engine, the code comprising computer executable instructions corresponding to an application;

parsing, by a computing device, the code to extract a portion of the code to evaluate for memory safety of floating-point instructions in the portion of the code;

analyzing, by the computing device, the portion of the code to determine if the portion of the code comprises a floating-point instruction; and in response to determining that the portion of the code comprises the floating-point instruction, generating, by the computing device, a set of memory addresses and registers written during execution of the floating-point instruction, symbolically executing, by the computing device, the portion of the code, assigning, by the computing device, a symbolic value into the set for each memory address and register in the set, and determining, by the computing device, if the symbolic value is used to calculate any memory address during the symbolic execution.

12. The method of claim 11, further comprising in response to determining that the portion of the code does not comprise the floating-point instruction, analyzing, by the computing device, the portion of code to determine if the portion of code comprises a conditional statement.

13. The method of claim 11, further comprising:

in response to determining that the portion of the code comprises the conditional statement, generating, by the computing device, a first set comprising a set of memory addresses and registers written during execution of the conditional statement, generating, by the computing device, a second set comprising a set of registers that may be used to compute a memory address being read or written to during execution of the conditional statement, and symbolically executing, by the computing device, the portion of the code.

14. The method of claim 11, further comprising:

determining, by the computing device, if a register in the second set comprises an input-dependent address or the symbolic value, in response to determining that the register in the second set comprises the input-dependent address or the symbolic value, generating an error, and in response to determining that the register in the second set does not comprise the input-dependent address or the symbolic value, resuming the symbolic execution, assigning, by the computing device, the symbolic value to each memory address and register in the first set, and determining, by the computing device, if the symbolic value is used to calculate any memory address during the symbolic execution.

15. The method of claim 11, further comprising:

in response to determining that the symbolic value is not used to calculate any memory address during the symbolic execution, determining, by the computing device, if another portion of code is available; and obtaining the other portion of code to determine if the other portion of code comprises a floating-point instruction, in response to determining that the other portion of code is available.

16. The method of claim 11, further comprising:

generating, by the computing device, a pass indication for the code in response to determining that the other portion of the code is not available.

17. The method of claim 11, wherein the symbolic value comprises FP-tag, the value of FP-tag comprising all possible values for a floating-point calculation made during execution of the floating point instruction, and wherein the method further comprises:

in response to determining that FP-tag is used to calculate one or more memory addresses during the symbolic execution, generating an alert; and in response to determining that FP-tag is not used to calculate any memory address during the symbolic execution, determining, by the computing device, if another portion of code is available; and obtaining the other portion of code to determine if the other portion of code comprises floating-point instructions, in response to determining that the other portion of code is available.

18. A computer-readable storage medium having computer readable instructions stored thereupon that, when executed by a computer, cause the computer to:

receive code at an evaluation engine, the code comprising computer executable instructions corresponding to an application;

parse the code to extract a portion of the code to evaluate for memory safety of floating-point instructions in the portion of the code;

analyze the portion of the code to determine if the portion of the code comprises a floating-point instruction; and in response to determining that the portion of the code comprises the floating-point instruction, generate a set of memory addresses and registers written during execution of the floating-point instruction, symbolically execute the portion of the code, assign a symbolic value to each memory address and register in the set, and determine if the symbolic value is used to calculate any memory address during the symbolic execution.

19. The computer-readable storage medium of claim 18, wherein the computer readable instructions further comprise instructions, the execution of which cause the computer to:

analyze the portion of the code to determine if the portion of the code comprises a conditional statement; and in response to determining that the portion of the code comprises the conditional statement, generate a first set comprising a set of memory addresses and registers written during execution of the conditional statement, generate a second set comprising a set of registers that may be used to compute a memory address being read or written to during execution of the conditional statement, symbolically execute the portion of the code, encounter the conditional statement during the symbolic execution of the code, determine if a register in the second set comprises an input-dependent address or the symbolic value, in response to determining that the register in the second set comprises the input-dependent address or the symbolic value, generate an error, and in response to determining that the register in the second set does not comprise the input-dependent address or the symbolic value, resume the symbolic execution, assign the symbolic value to each memory address and register in the first set, and determine if the symbolic value is used to calculate any memory address during the symbolic execution.

20. The computer-readable storage medium of claim 19, wherein the computer readable instructions further comprise instructions, the execution of which cause the computer to:

in response to determining that the symbolic value is not used to calculate any memory address during the symbolic execution, determine if another portion of code is available;

obtain the other portion of code to determine if the other portion of code comprises floating-point instructions or conditional statements, in response to determining that the other portion of code is available; and generate a pass indication for the code in response to determining that the other portion of the code is not available.

* * * * *